Sept. 15, 1931.    J. W. LEGG    1,823,326
VIBRATION RECORDER
Filed June 16, 1926    2 Sheets-Sheet 2
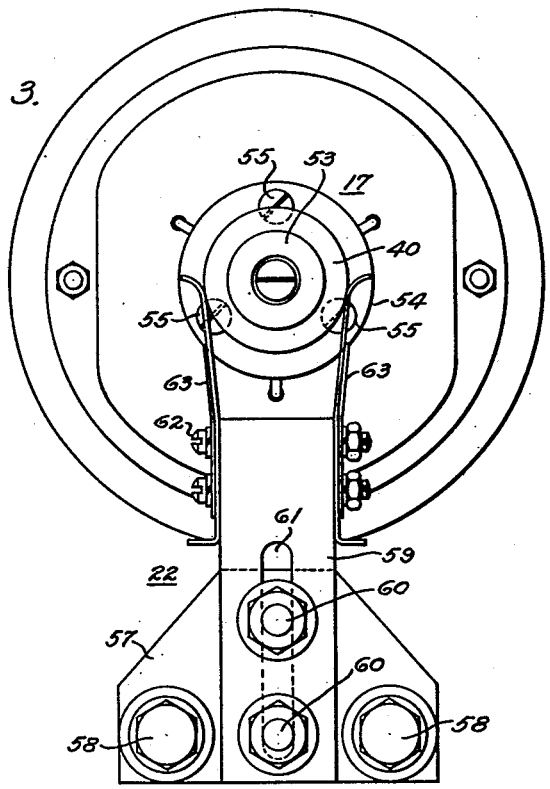
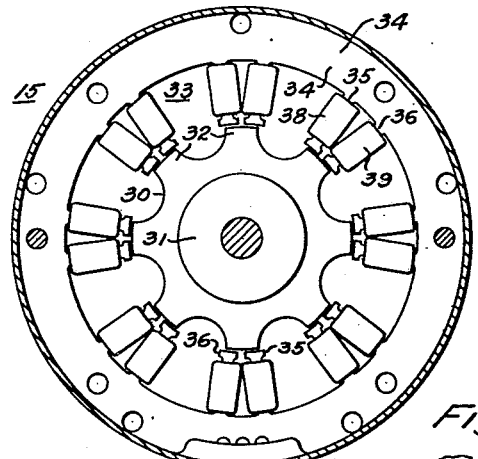
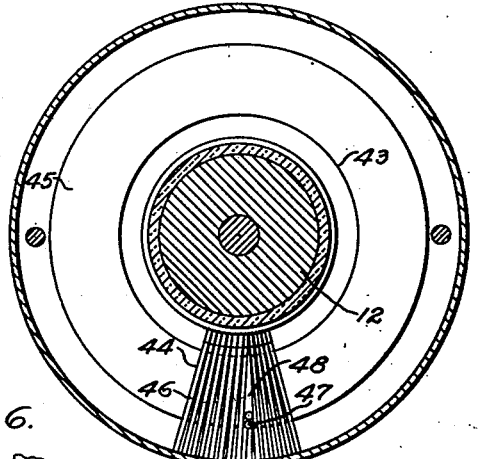
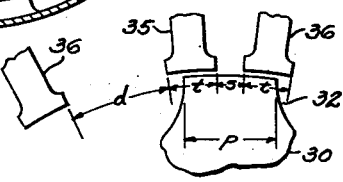
WITNESSES:
INVENTOR
Joseph W. Legg.
BY
ATTORNEY Patented Sept. 15, 1931

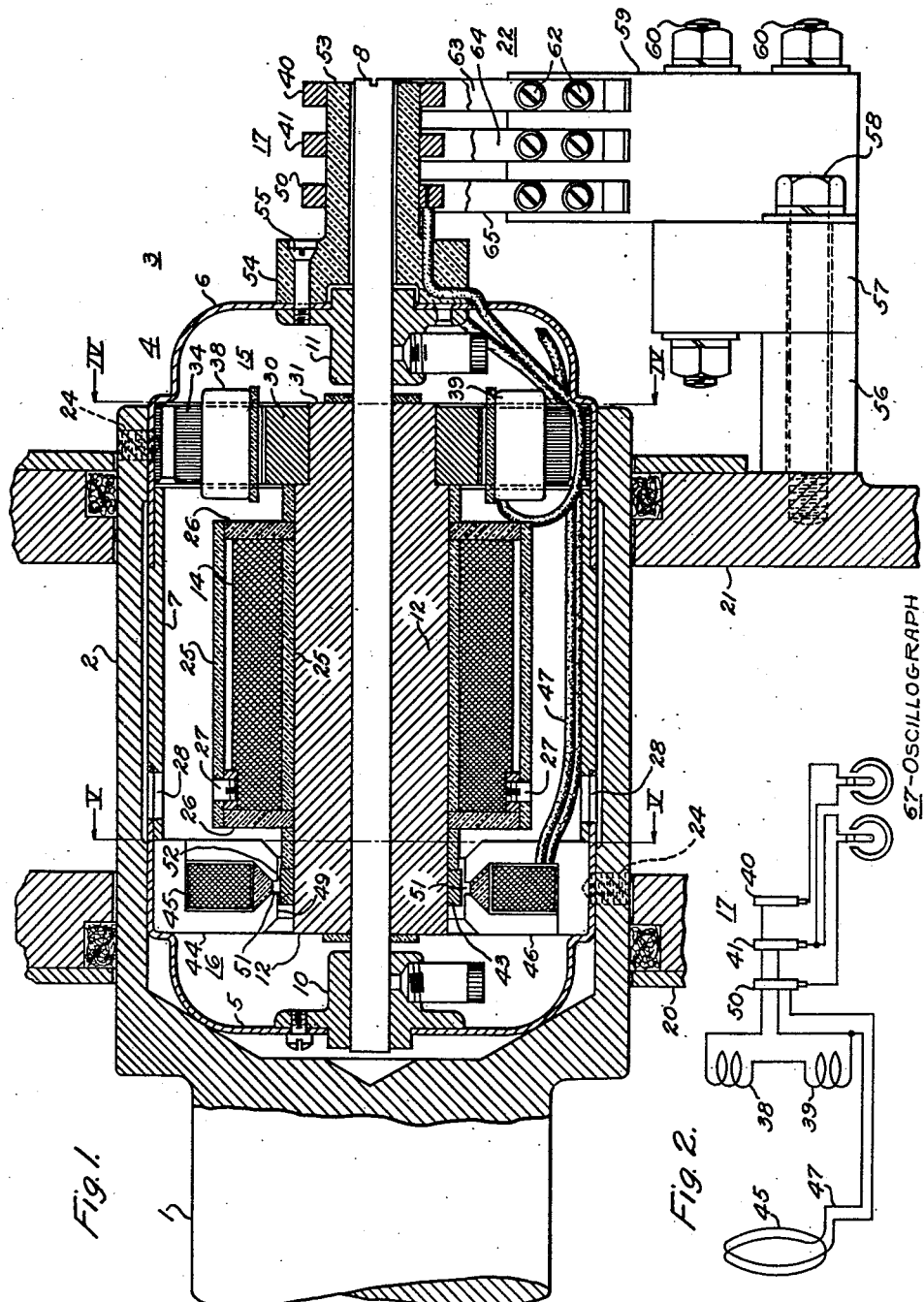

1,823,326

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

VIBRATION RECORDER

Application filed June 16, 1926. Serial No. 116,502.

My invention relates to vibration-recording devices and particularly to devices for recording the vibrations of rotating members.

One object of my invention is to provide a device, of the above-indicated character, for cooperation with an oscillograph to measure the longitudinal and rotational vibrations of rotating members.

Another object of my invention is to provide a compact vibration recorder that may conveniently be attached to the rotating members of machines.

Another object of my invention is to provide an induction alternator in which the relatively-movable elements shall, at the natural position thereof and within a relatively wide range of movement from such position, generate maximum voltage for a given movement instead of a minimum voltage, as in induction alternators of the usual types.

A further object of my invention is to provide a vibration recorder that shall be simple and durable in construction, economical to manufacture and effective in its operation.

In any vibration-recording device heretofore employed, of which I am aware, the losses in transmitting the motions to be recorded have been of such nature as to render the devices only approximate in their indications which, while suitable for certain purposes, are very ineffective where highly sensitive and accurate indications are desired.

For instance, in the operation of steam turbines, certain very deleterious effects, as discovered by the use of my invention, occur at relatively low or critical speeds, whereas, at higher speeds, contrary to natural expectations, the turbines operate in comparative safety, so far as immediate danger to the more readily damageable portions of the turbines is concerned. In other words, there are conditions, not ordinarily observable, under which the thousands of small turbine blades or buckets are likely to be damaged. In this sense, the device of my invention functions as a guide or indicator in determining the safe and effective speeds at which rotatable members, such as turbine rotors, should be operated.

The device of my invention is also highly effective in determining the different effects of gearings of various types on the same turbine or rotor, thus assisting materially in a study of the best translating mechanisms for cooperation with the rotor.

In practicing my invention, I provide an induction alternator having relatively-movable elements, one of which is for attachment to a rotatable member and the other of which is of such inertia and relation to the first member as to be sensitively responsive to vibrations of any nature in the rotatable member, whether these vibrations are rotational or longitudinal.

Two inductor elements, employing one magnetizing field device, are so constructed as to be instantly and proportionately responsive to rotational and longitudinal vibrations, regardless of the relative positions of the elements of the device over a wide range of relative movement. That is, there is a natural relative position which the recorder elements tend to seek and from which they may depart considerably and still induce proportionate voltages for proportionate vibrations. This is contrary to the usual induction alternator which, in any movement from, and adjacent to, the natural position of the relatively movable elements, generates minimum voltages.

The above-mentioned voltages are employed with an oscillograph to operate the galvanometer mirrors in connection with sensitized or photographic charts in such manner as to permit the recording of the vibrations.

All of the above-outlined features will be hereinafter more fully and completely set forth.

Figure 1 of the accompanying drawings is a side or longitudinal view, partially in elevation and partially in section, of a portion of a vibration-recording device constructed in accordance with my invention, together with a portion of a turbine rotor with which it is adapted to cooperate, Fig. 2 is a circuit diagram of certain electrical features of my invention, Fig. 3 is an end elevational view of the device shown in Fig. 1, as viewed from the right, Figs. 4 and 5 are views taken along the lines IV—IV and V—V, respectively, of Fig. 1, and Fig. 6 is an enlarged detail or fragmentary view of portions of the device as viewed in Fig. 4.

As viewed in Fig. 1, the rotor 1 of a steam turbine or other device is provided, at one end, with a hollow cylindrical shell portion 2 which may be integrally united therewith or provided as a separate detachable member.

The shell portion 2 is open, at its outer end, for the reception of an induction alternator 3 which comprises, in general, an outer casing 4 embodying end members 5 and 6 and a central member 7, a shaft 8 of non-magnetic steel, bearing members 10 and 11 in the end members 5 and 6, respectively, for the shaft 8, a permanent-magnet sleeve or cylinder 12, preferably of cobalt steel, fixed to the shaft 8, a magnetizing coil 14 for the permanent magnet 12, a rotational-vibration inductor device 15 at one end of the magnet 12, a longitudinal-vibration inductor device 16 at the other end of the magnet 12 and a slip-ring or current-collector device 17 at the outer end of the shaft 8.

The rotor 1 is provided with stationary oil-packing rings or members 20 and 21, around the sleeve portion 2 thereof, to the member 21 of which is secured a brush device 22 for cooperation with the slip-ring device 17.

The member 7 is of relatively thin steel turned down at its ends for sliding-fit reception of the end members 5 and 6 which are also of steel, the members 5, 6 and 7 being constructed for a sliding fit into the sleeve portion 2 of the rotor 1 wherein they are held, as by screws 24.

The magnetizing coil 14, preferably constructed of a relatively large number of turns of relatively heavy wire and adapted to carry enough current to provide approximately 200,000 ampere turns, is mounted on the magnet member 12 from which it is separated by enclosing insulating sleeves 25 and end members 26.

Screw-socket terminal members 27 for the coil 14 are disposed diametrically opposite registering openings 28 in the members 5 and 7. The terminals 27 are for the reception of conducting leads (not shown) through the openings 28 when the inductor 3 is separated from the sleeve 2. The openings 28 may be closed by turning the members 5 and 7 relatively a slight distance so that a solid portion of each is disposed opposite the opening in the other.

The rotational-vibration inductor device 15 comprises a soft-steel armature element 30 that is fixed to a reduced portion 31 of the magnet member 12 and comprises eight uniformly-spaced north-pole portions 32.

A pick-up element 33 of the device 15 comprises an annular laminated structure 34 of soft-steel punchings having eight pairs of inwardly projecting teeth 35 and 36 for cooperation with the eight north-pole portions 32 of the armature 30. This structure may conveniently be made by removing every third tooth from punchings initially having twenty-four equally-spaced teeth.

As indicated more clearly in Fig. 6, the peripheral length or span in the direction of relative movement between the elements 30 and 34 of each pair of the teeth 35 and 36 must be greater than the peripheral length or span of each north-pole portion 32 of the armature 30. In other words, the distance $t+s+t$ must be greater than the distance $p$, as marked in Fig. 6, as will hereinafter be more fully explained. Also, the distance $t+s$ must be less than the distance $p$ and the distance $d$ must be greater than the distance $p$.

The teeth 35 and 36 of each pair thereof are provided with, and constitute cores for, coils 38 and 39, respectively, which are wound in opposite directions and connected, with all of the other coils 35 and 36, in series-circuit relation between outer and central ring members 40 and 41 of the slip-ring device 17.

The longitudinal-vibration inductor device 16 comprises a soft-steel armature or ring 43 secured to the magnet 12 and a cooperating relatively movable casing 44 built up around a coil 45 of toroidal shape.

The casing 44 comprises relatively small soft-steel punchings 46 of substantially L-shape which are disposed radially about the coil 45 in such position that the short legs or bases of the L's concur at the outer perimeter of the coil, and the vertical or longer arms are on alternate sides of the coil except at the place where coil leads 47 enter the casing 44. At this place two or more contiguous punchings are interposed with conforming or registering vertical arms on the same side of the coil 45 to form an opening 48 on the opposite side thereof for the reception of the leads, as indicated in Fig. 5. In this figure, only a few of the punchings are shown on opposite sides of the opening 48 for clearness, it being understood that the punchings extend all around the coil 45.

The inner extremities of the punchings 46 are so shaped that, in the assembled structure, two parallel coaxial cylindrical areas 49 (see Fig. 1) thereof, separated by an air-gap 51, are presented to the outer cylindrical surface of the armature ring 43 from which they are spaced by a short air gap 52. This ring is of such width, as viewed in Fig. 1, as to always remain within the outer lateral limits of the areas 49, when the shaft 8 vibrates longitudinally, as will hereinafter be pointed out. Also, to render the casing 44 ring shaped, the radius to the transverse edge of the punchings 46 next to the outer perimeter of the coil 45 should be substantially twice the radius of the areas 49 from the axis of the shaft 8.

One of the leads 47 to the coil 45 extends to the central ring 41 of the slip-ring device 17 and the other to an inner ring 50 thereof.

In the structure above described, a complete magnetic path is established from the magnet member 12 through the armature 30, the laminated structure 34, the members 6, 7 and 5, the casing 44 and the armature 43, back to the magnet member 12.

The slip rings 40, 41 and 50 are mounted on an insulating bushing or sleeve 53 having a laterally projecting inner-end portion 54 through which screws 55 extend for securing the sleeve 53 and the bearing 11 to the member 6.

The brush device 22 comprises bracket elements 56 and 57 that are secured to the member 21, as by bolts 58, and an insulating block 59 that is vertically adjustably secured to the member 57 by bolts 60 which extend into the member 57 through a slot 61 in the block 59.

Screws or bolts 62 provide means for mounting pairs of brushes 63, 64 and 65 on the block 59 and for securing the leads for cooperation with the slip rings 40, 41 and 50, respectively.

The permanent magnet 12 is magnetized in position in complete assembly in order that maximum strength may be secured. For this purpose, the coil 14 is turned to such position that terminals, (not shown), may be passed through apertures 28 in the casing 1 to make the proper engagement with the terminal sockets 27 on the coil 12. A strong current is passed through coil 14 for a sufficiently long period of time to give maximum magnetization practicable in the permanent magnet 12.

In operation, all of the parts associated with the casing 4 rotate with the machine member to which it is directly attached, the rotation and all vibrations of the machine member being imparted directly to the casing 4 and said associated parts.

The armatures 30 and 43 and the permanent magnet 12 are carried by the shaft 8 and are free to rotate with the shaft in its bearings 10 and 11. The casing 4, which holds the bearings 10 and 11, is rotated, and the friction of the bearings and magnetic pull between the relatively movable portions of the induction alternator 3 impart rotary motion to the shaft 8 which will be at the same rate as the casing 4 after a sufficient period of time has elapsed. Since the shaft 8 turns freely in its bearings and has considerable inertia, the rotational and the longitudinal vibrations of the rotating-machine members and the casing 4 will not effect its motion perceptibly.

When the shaft attains a speed equal to that of the casing 4, the north poles 32 of the armature 30, which is carried by the shaft 8, assume positions opposite pairs of south poles on the pairs of teeth or poles 35 and 36 of the pick-up coils 38 and 39. The course of the flux from the permanent magnet 12 in this position, is through the armature 30, the north poles 32, across the air gap into the pairs of poles 35 and 36, the casing 4 and the laminated casing 44 of the coil 45, where the flux divides to follow paths on each side of the coil 45 to the cylindrical areas 49, across the air-gap 52 and into the armature 43, back to the permanent magnet 12.

When there are no vibrations, the course of the flux is unchanged, there is no tendency for the north poles 32 of the armature 30 to shift their positions with respect to the pick-up coils 38 and 39 and these parts are in stable relation. But, since the area or span of any two poles 35 and 36 of the pick-up coils is greater in the direction of relative movement between the north and south poles than the area or span of an opposite north pole 32 of the armature 30 and there is no greater reluctance in one pole than the other of the pair, a slight rotational vibration will readily change the relation of the north pole 32 to the pair of poles 35 and 36 and thereby change the proportion of flux entering the poles 35 and 36, increasing the flux in the one and decreasing it in the other.

It is to be observed that this stable relationship occurs in a position where maximum flux exists and where a slight shifting of the armature 30 causes a maximum shifting of the flux from one pole 35 to the other 36, and, furthermore, that the amount of flux shifted is the same for all equal angles of rotational vibration, so long as the north pole 32 remains within the limits of the poles 35 and 36.

Stable equilibrium in position where a given movement causes maximum change in flux is obtained by having the distance $d$ greater than the distance $p$, as above mentioned.

In practically all other generators of which I am aware, the position of stable equilibrium corresponds to the position where small angular movements cause very little change of flux in the armature coils. In this case, stable equilibrium exists where a small angular movement of armature gives maximum change of flux within the pick-up coils 38 and 39. This effect is obtained by having each set of teeth relatively far from each other set.

Thus, a rotational vibration of the turbine shaft 1 and, hence, of the pick-up system 33 relative to the field magnet 12 affects the relation of each north pole 32 of the armature 30 to the juxtaposed south poles 35 and 36. The distribution of flux entering the two south poles is changed, this change in the flux traversing the poles 35 and 36 upon which are mounted the coils 38 and 39, in which currents are induced to operate an oscillograph 67, is indicated diagrammatically in Fig. 2. Every successive coil is wound opposite to the preceding one. Also, whenever the flux is increased in one pole, such as 35, it decreases in the next pole 36. As a result, the voltage of the whole pick-up system 33 is the sum of the voltages of all of the coils 35 and 36. This voltage causes a current to pass through the oscillograph vibrator to be recorded on a photographic film. Since a light wave is recorded on the oscillograph which may be measured, the amplitude, direction and frequency of the rotational vibration may be ascertained.

When no longitudinal vibrations are altering the relation of the coil 45 and the permanent magnet 12, the lines of flux enter the laminated casing 44 of coil 45 from the casing 4, traverse the vertical sides of the casing 44 and extend across the air-gap 52 into the armature 43 which conducts them to the permanent magnet 12. So long as the relative areas of the two cylindrical magnetic conducting areas 49 conforming to the armature are unchanged by longitudinal vibrations, no current is induced in the coil 45, but, if such vibration shifts the casing 44 and the associated coil 45, the areas of the cylindrical areas 49 conforming to armature 43 are varied. Such a change in the relative positions of the opposite magnetic surfaces alters the distribution of flux in the sides of the laminated casing 44 which causes lines of flux to cut the windings of coil 45, thereby inducing a current in it capable of effecting the operation of the oscillograph 67. The displacement of the areas governs directly the quantity of flux cutting the windings of the coil 45.

The voltage induced in any coil is proportional to the rate of change of flux within the coil. It is proportional to the amplitude of vibration and to the frequency of vibration.

The coils in this converter have many turns of wire and are so designed that their inductance is large, in comparison with their ohmic resistance, so that the resulting current flowing in the oscillograph does not increase with the frequency, but is proportional to the amplitude of vibration only. This is important in such vibration recorders, for then the calibration is constant for all but very low frequencies of vibration.

In the structure above described, neither the rotational nor the longitudinal reaction has any effect on the other.

Obvious modifications of the device consist in making both ends like the structure shown in Fig. 4 for torsional measurements only or like the structure shown in Fig. 5 for longitudinal measurements only.

My invention provides means for measuring rotational and longitudinal vibrations of rotating members of machines. The determination of their vibrations shows critical speeds to be avoided as constant speeds in running the machine tested and demonstrates inherent defects in design which may be corrected. While I have shown and described a particular form of my invention, changes may be effected therein without departing from the spirit and scope thereof, as set forth in the appended claims.

I claim as my invention:

1. A vibration-responsive device comprising movable elements, means for rotatably mounting said elements, one of which embodies spaced pole areas of a given overall span in the direction of relative movement and another of which embodies a pole area of less span than said spaced areas and of greater span than the space between said areas, a winding mounted on said one element, means for so magnetically coupling said elements that said pole area assumes a position in stable equilibrium relative to said spaced areas and of maximum flux change through said coil when moved within the outer limits of the greater of said spans, and means for coupling one of said elements to a source of vibrations.

2. A vibration-responsive device comprising juxtaposed relatively movable elements one of which embodies a pair of poles spaced apart and having certain pole areas and another of which embodies a pole having a pole area of greater dimension in the direction of relative movement than the distance between said first-named pole areas, means for mounting said pair of poles and said pole so that the pole areas of said pair may be positioned opposite the pole area of said pole, means for magnetically coupling said elements by passing a magnetic flux of constant magnitude between said poles whereby said elements assume relative positions in stable equilibrium, a winding wound on each of the poles of said pair, the winding on one pole being connected in series with and in opposition to the winding on the other pole, and means for coupling one of said elements to a source of vibrations.

3. In a vibration-responsive device, an annular element of magnetic material having a plurality of pairs of pole portions, a movable cooperating element having a pole portion for each of said pairs of pole portions and of less span than its corresponding pair in the direction of relative movement between said elements, means for so movably mounting one of said elements that said pairs of pole portions and said second-named pole portions are positioned in juxtaposed relation, a coil on one of the pole portions of each of said pairs connected in series and wound opposite to a coil on the other pole portion of the pair, means for passing magnetic lines of force between said pairs of pole portions and said second-named pole portions, and means for coupling one of said elements to a source of vibrations.

4. A vibration-responsive device comprising a coil, an element of magnetic material of substantially U-shape surrounding a portion of the coil, an element of magnetic material disposed adjacent to the ends of the U-shaped element, means for so mounting said second element that it can move relatively to said first element in a direction parallel to a line connecting the free ends of the U to generate a voltage in said coil, said second element being of less span in the direction of said relative movement than the overall span of the free ends of said first element in said direction and being of greater span in the direction of relative movement than the distance between said free ends, and means for coupling one of said elements to a source of vibrations.

5. In a vibration-responsive system, an element which embodies spaced pole areas, means for rotatably mounting said element, a second element which embodies a certain pole area, means for rotatably mounting said second element in juxtaposed relation to said first-named element, said spaced areas having a given overall span in the direction of relative movement, said certain pole area having less span than said spaced areas and a greater span than the space between said spaced areas, means for coupling one of said elements to a source of vibrations, means for magnetically coupling said elements by passing a magnetic flux of constant magnitude between said poles whereby said elements assume relative positions in stable equilibrium, a winding wound on each of the poles of said pair, the windings being connected in series and in opposition and being connected to an electro-responsive device.

6. A vibration-responsive device comprising a coil, an element of magnetic material of substantially U-shape surrounding a portion of the coil, means for rotatably mounting said U-shaped element, an element of magnetic material disposed adjacent to the ends of the U-shaped element, means for so rotatably mounting said second element that it can move relatively to said U-shaped element in a direction parallel to a line connecting the free ends of the U and perpendicular to the direction of rotation to generate a voltage in said coil, said element being of less span in the direction of said relative movement than the overall span of the free ends of said U-shaped element in said direction, means for passing magnetic lines of force between said second element and the free ends of the U in such a direction that said ends are of like polarity, and means for coupling one of said elements to a source of vibrations.

7. A vibration-responsive device comprising an annular coil, an annular element of magnetic material of substantially U-shape in cross-section surrounding said coil, an annular element of magnetic material disposed adjacent to the ends of the U-shaped element, means for so mounting said second element that it can move relatively to said first element in a direction parallel to a line connecting the free ends of the U to generate a voltage in said coil, means for passing magnetic lines of force between said second element and the free ends of the U in such a direction that said ends are of like polarity, and means for coupling one of said elements to a source of vibrations.

8. A vibration-responsive device comprising a housing of magnetic material, a magnetized element, means for longitudinally and rotatively mounting said element in said housing, structures of magnetic material, means for so mounting said structures on said housing that they cooperate with the different portions of said elements, said housing being in series magnetic flux relation to said magnetized element and to said structures, means including coils cooperating with said structures for effecting voltages in accordance with said longitudinal and rotative movements, and coupling means for causing a source of vibrations to effect a relative movement between said housing and said magnetized element.

9. A vibration-responsive device comprising a main longitudinally and rotationally-movable magnetized element, a member having a plurality of pairs of pole portions thereon which surround a portion of said main element, said main element having a pole portion for each of said pairs of pole portions and of less span in the direction of rotational movement than the overall span of its corresponding pair in said direction, a coil on one of the pole portions of each of said pairs wound in a direction opposite to the coil of the pair, an annular coil surrounding a portion of said main element, an annular element of magnetic material of substantially U-shape in cross-section surrounding said annular coil, said main element having an annular portion adjacent to the ends of the U-shaped element of less span in the direction of said longitudinal movement than the overall span of the free ends of the U-shaped element in said direction, means for passing magnetic lines of force between said pairs of pole portions and said pole portion of opposite polarity and between said U-shaped element and said annular portion, electro-responsive means connected to said coils to be affected in accordance with said longitudinal and rotational movements, and coupling means for causing a source of vibrations to effect relative movement between said main element and said member.

10. A vibration-responsive device comprising juxtaposed relatively movable elements, means for rotatably mounting said elements, one of said elements embodying a pair of poles spaced apart and having pole areas of greater dimension in the direction of relative movement than the distance between said first-named pole areas, said pair of poles and said pole being so mounted that the pole areas of said pair may be positioned opposite the pole area of said pole, means for magnetically coupling said elements by passing a magnetic flux of constant magnitude between said poles whereby said elements assume relative positions in stable equilibrium, a winding mounted on said one element with at least a portion thereof located between said first named poles, and means for coupling said elements to a source of vibrations.

11. In apparatus for indicating the vibration of a member, means for rotatably mounting said member, a core of magnetic material rigidly connected to said member and having a winding thereon, a heavy magnetized member, means for rotatably mounting said magnetized member with respect to said core, and means for so passing flux through said magnetized member and said core that the flux induces a voltage in said winding when relative movement occurs between said core and said magnetized member.

12. In apparatus for indicating the vibration of a member, means for rotatably mounting said member, an element rigidly attached to said member, a heavy element of magnetic material, means for rotatably mounting said heavy element with respect to said first element, a winding supported by one of said elements, means for magnetically coupling said elements for causing them to rotate simultaneously and for inducing a voltage in said winding in response to relative movement between said elements.

In testimony whereof, I have hereunto subscribed my name this 2nd day of June, 1926.

JOSEPH W. LEGG.